May 24, 1960    J. M. CONSTABLE    2,938,123
STABILIZED PULSE-RATE COUNTING METER
Filed July 1, 1955

INVENTOR.
JAMES M. CONSTABLE
BY
Curtis, Morris & Safford
ATTORNEYS

United States Patent Office 2,938,123
Patented May 24, 1960

2,938,123

STABILIZED PULSE-RATE COUNTING METER

James M. Constable, White Plains, N.Y., assignor to Electronic Products Company, Mount Vernon, N.Y.

Filed July 1, 1955, Ser. No. 519,544

14 Claims. (Cl. 250—83.6)

This invention relates to pulse rate counting meters and, in particular, to stabilized low drain meters of this kind which are suitable for use in portable radiation measuring equipment.

An object of this invention is to greatly improve the efficiency and sensitivity of pulse rate counting meters. Another object is to make such meters more accurate by making them substantially insensitive to variations in pulse size within a wide range of sizes.

A common way of measuring penetrating radiation, such as X-rays or atomic radioactivity, is to convert this radiation into pulses by means of a Geiger-Müller tube and then to measure the pulse repetition rate since this rate is proportional to the intensity of the radiation. One of the difficulties with this way of measurement however is the very low energy available from the Geiger-Müller tube to drive an indicating instrument. In the past it has been customary to amplify the pulses from the Geiger-Müller tube to obtain the necessary energy level. Although this intermediate amplification is satisfactory where auxiliary power is plentiful, it is impractical where the radiation meter must be portable and operate on self-contained batteries for long periods of time. To meet requirements for portability it is highly desirable to have a pulse rate counting meter circuit so sensitive that it can be energized directly from the Geiger-Müller tube.

It is convenient, in measuring the pulse repetition rate of the output pulses from a Geiger-Müller tube, and thus radiation intensity, to obtain from the pulses a varying direct current whose average value is proportional to this rate. One drawback with this method is that the average current derived from the output pulses from the Geiger-Müller tube is very minute, of the order of a microampere, and is usually less than is needed to give an adequate or accurate needle deflection with current indicating meters which are commercially available and which are relatively inexpensive. Such meters, which have relatively low impedance, are unable—in the absence of special provisions—to make efficient use of the energy output from the Geiger-Müller tube, which has an impedance of the order of megohms, because of the very great impedance mis-match between load and source.

A second drawback in measuring average current to determine pulse repetition rate (and thus radiation intensity) is that the pulses produced by the Geiger-Müller tube can vary in absolute size from pulse to pulse and thus cause a change in the average current even though the pulse repetition rate remains the same. The present invention is intended to overcome these drawbacks.

In accordance with the present invention, a portion of the pulse output energy from the Geiger-Müller tube is converted into a form in which it can readily be utilized by a relatively inexpensive meter. Moreover, the portion of the energy which is converted is approximately constant for each pulse, i.e. it is substantially independent of the total pulse energy within a wide range of pulse sizes. In a specific illustrative embodiment of the invention the output energy from a Geiger-Müller tube is stored in the form of a magnetic field whose maximum energy content is limited to an approximately constant value. This energy is then converted into a relatively large-current low-voltage signal which can be read directly by an inexpensive microammeter.

A better understanding of the invention together with a fuller appreciation of its many advantages will best be gained from the following description given in connection with the accompanying drawings in which.

Figure 1:
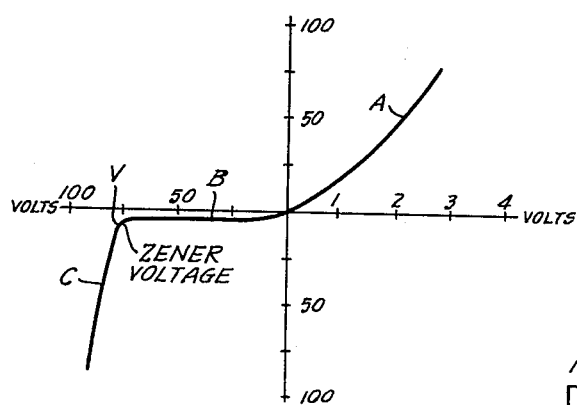
Figure 1 illustrates the current conduction vs. applied voltage characteristic of a crystal diode having a Zener breakdown voltage.

Referring now particularly to the drawings, Figure 1 shows in approximate order of magnitude the current vs. voltage characteristic for a crystal diode, such as type 1N138, which is a silicon junction diode. Portion A of the characteristic indicates that for a forward voltage of the order of 2 volts, a current of the order of 50 ma. will flow in the forward direction, that is, from anode to cathode, through the diode. Portion B in the third quadrant indicates that for a reverse voltage up to the order of say 75 volts only several microamperes of current will flow through the diode in the reverse direction. However, at point V (the Zener breakdown voltage) on the characteristic the diode changes its conductivity sharply and thereafter as the reverse voltage is increased slightly, current increases very rapidly, as shown by portion C. This phenomenon of Zener voltage breakdown is utilized in the present invention.

Figure 2:
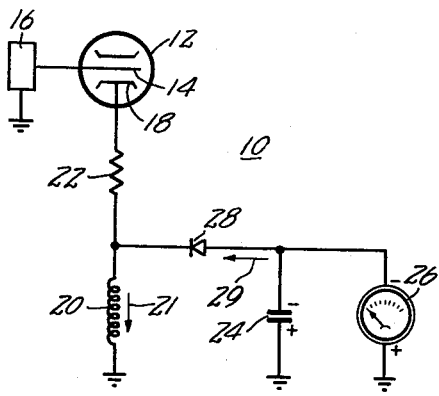
Figure 2 shows an illustrative embodiment of the invention.

Figure 2 shows by way of example a radiation detecting meter 10 utilizing the present invention. This meter includes a Geiger-Müller tube 12 which is energized through its anode 14 by a suitable power source 16, which may be one well known to the art such as described in "Nucleonics" January 1953, p. 22, or that shown in U.S. Patent No. 2,584,844, or one as shown in co-pending application, Serial No. 561,331, filed January 25, 1956, now U.S. Patent No. 2,833,932. Cathode 18 of tube 12 is connected to an inductor 20 through a dropping resistor 22 of suitable value. The other end of inductor 20 is grounded so that there will be a direct-current path through the tube.

When tube 12 is exposed to penetrating radiation, it is discharged periodically at a rate determined by the intensity of the radiation. Each discharge, or ionizing incident as it is called, produces a pulse of current through the tube.

At the beginning of each pulse, the load impedance seen by tube 12 is very large, being primarily that presented by inductor 20. Accordingly, most of the voltage of the pulse appears across this inductor. The impedance of tube 12 is thus effectively matched to that of the load placed upon it.

Very shortly after the initiation of a pulse, the pulse voltage level reaches a maximum value as will be explained and then continues at this value for approximately the remainder of the pulse. Therefore, current through the inductor 20 increases in the direction of the arrow 21 until a steady current is reached, this condition being reached before the end of the pulse comes. The steady state current level is determined by the series resistance of inductor 20 and by the value of voltage applied across it, this voltage being substantially constant during the pulse, as will be explained.

With the end of a pulse, tube 12 ceases to conduct but the current flowing through inductor 20 at that instant continues to flow. Since the current's return path through tube 12 has now been cut off, this current is forced to flow along the path through condenser 24 in parallel with meter 26 and through diode 28, the latter being poled for forward current flow in the direction of the arrow 29.

At the instant current begins to flow along this path, assuming the voltage across capacitor 24 is zero, all the current flows into the capacitor and none through the meter. Thereafter, the voltage across capacitor 24 builds up and a current flows through meter 26. In this way, and since capacitor 24 can be made very large, effectively all the energy generated by each pulse and contained in the form of magnetic flux in inductor 20 is transferred first to capacitor 24 where it takes the form of electric charge and thence ultimately into a more or less steady mechanical deflection of meter 26. The charge that is dissipated in meter 26 is proportional to the number of pulses per unit of time applied to inductor 20. Thus the meter reading is proportional to the intenstiy of the radiation falling on tube 12.

Diode 28, poled in the way shown, prevents the current flowing from cathode 18, except for a very small amount of reverse diode current which can be neglected for present purposes, from reaching meter 26 before it has passed through inductor 20. Moreover, diode 28 poled in this way prevents the charge on capacitor 24 from flowing back through the inductor instead of into meter 26 as desired.

By using for diode 28 a diode having a Zener breakdown voltage characteristic such as shown in Figure 1, it is possible to limit effectively the maximum current flowing in the direction of arrow 21 through inductor 20. When the voltage across inductor 20 exceeds the Zener voltage of this diode, excess current instead of flowing through the inductor flows in the reverse direction through the diode, that is, reverse to the direction indicated by arrow 29 and into the meter circuit. The current which flows reverse to arrow 29 is very small and its effect will be to counter to a certain extent the imperfect clipping action of diode 28. The circuit of Figure 2 is effectively stabilized and the reading of meter 26 is thus made approximately independent of pulse size and dependent only on pulse repetition rate.

Figure 3:
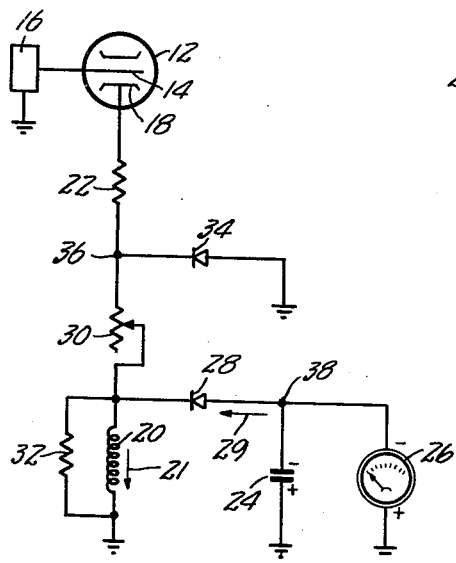
Figure 3 shows a second illustrative embodiment of the invention.

A more effectively stabilized circuit than that just described is shown in Figure 3. Elements here corresponding to elements in Figure 2 have been given corresponding reference numbers. Here a pulse from tube 12 passes from cathode 18 to ground through dropping resistor 22, the calibrating resistor 30 and inductor 20 in parallel with a temperature compensating resistor 32. A Zener diode 34 is connected between ground and the junction 36 fo the resistors 22 and 30, this diode 34 being poled to oppose the normal flow of current from junction 36 to ground. However, when the voltage at junction 36 exceeds the Zener breakdown voltage of diode 34, additional current, instead of flowing to ground through resistor 30, inductor 20 and resistor 32 will be shunted to ground through this diode. Thus for each pulse the voltage at junction 36 will remain approximately constant for the duration of the pulse within a wide range. By making resistor 32 suitably variable in resistance with temperature, the effects of temperature on the characteristics of diodes 34 and 28 and the corresponding changes caused in circuit operation can be substantially eliminated. The size of resistor 32 must be chosen in relation to the characteristics of diode 28 and diode 34 and is best determined by measurement. By setting resistor 30 during operation of the circuit, meter 26 can be calibrated to a convenient level for a given value of radiation intensity and this calibration will thereafter remain substantially constant regardless of pulse size within a given range of sizes and of temperature changes within a reasonable range.

In the circuit of Figure 3, diode 28 should have a Zener breakdown voltage equal to or greater than that of diode 34. If desired, the grounded side of the latter may be connected instead of to ground as shown, to the junction 38 of meter 26, capacitor 24 and diode 28 so that overflow current from junction 36 passes through the meter circuit. This alternative is desirable in that it adds somewhat to the stabilization of the meter circuit.

A virtue of any of the above embodiments is that the metering circuit in each is wholly passive (i.e. does not contain a voltage source) yet is effectively stabilized and adapted to be energized solely by a Geiger-Müller tube without the need of intermediate amplifiers or complex or expensive equipment. Moreover since in each of the above circuits a simple inductor having only a single winding is used instead of a transformer having a primary and a secondary winding, not only are the size and cost of the circuits reduced, but, since there are no coupling losses in an inductor between windings as in a transformer, the efficiency of the circuit is correspondingly increased.

Suitable values or types of the individual elements in the circuit of Figure 3 can be as follows. These values or types are given merely by way of illustration and are not intended as limiting the invention.

Tube 12—type EP-72M, manufactured by Electronic Products Co.; resistor 22—50,000 ohms; resistor 30—50,000 ohms; resistor 32—type 763 manufactured by the Globar Division of the Carborundum Company, inductor 20—2 henrys' inductance and roughly 3,000 ohms winding resistance; diode 34—type 1N138; diode 28—type 1—217; capacitor 24—500 microfarad; meter 26—0 to 50 microampere scale and approximately 2,000 ohms resistance.

Various modifications or changes in the embodiments above described will occur to those skilled in the art and these modifications or changes may be made without departing from the spirit or scope of the invention as set forth.

I claim:

1. A penetrating radiation meter comprising a Geiger-Müller tube which produces signals when exposed to penetrating radiation, means for energizing said tube, and means for converting the signals from said tube into a meter reading proportional to the average intensity of the penetrating radiation, said means for converting including magnetic means for storing a portion of the energy of said signals in the form of magnetic fields, a crystal diode having a Zener breakdown voltage and connected to said magnetic means for limiting the energy stored therein, and a current indicating meter shunted by a large capacitor and connected to receive energy stored in said magnetic means and to produce a meter reading therefrom.

2. A penetrating radiation meter comprising a Geiger-Müller tube which produces signals when exposed to penetrating radiation, means for energizing said tube, and means for converting the signals from said tube into a meter reading proportional to the intensity of the penetrating radiation, said means for converting including a calibrating resistor and an inductor connected in series with said tube, a crystal diode having a Zener breakdown voltage for limiting the maximum voltage across said resistor and inductor, and a current indicating meter shunt connected with a large capacitor and connected through a current rectifier in series in a closed loop with said inductor.

3. A low drain high efficiency pulse rate meter comprising a relatively large inductor for storing a portion of the energy of each of a series of pulses, relatively low resistance pulse integrating current-indicating meter means, a common connection between one end of said meter means and one end of said inductor, and a current rectifier connected between the other ends of said meter means and said inductor said rectifier poled so that energy stored in said inductor can pass in reverse direction into said meter means.

4. A low drain stabilized pulse rate counting network comprising an inductor for storing a portion of the energy of each of a series of pulses, means including a current indicating meter connected to said inductor in the forward direction for receiving current flowing in said inductor, and means including a semi-conducting device having a Zener breakdown voltage for limiting to a fixed amount the maximum voltage across said inductor caused by each of said pulses and for passing excess energy through said meter in the reverse direction.

5. A low drain stabilized pulse rate meter comprising an inductor for storing a portion of the energy of each of a series of pulses, means for limiting the amount of energy stored in said inductor by each of said pulses even though said pulses vary in size, and means including a current indicating meter connected in parallel with a storage capacitor for receiving the energy stored in said inductor by each of said pulses and for converting it into a meter reading proportional to the average number of said pulses per unit of time.

6. A portable stabilized radiation measuring instrument comprising a Geiger-Müller tube, means to energize said tube, and a meter circuit connected to receive the pulse energy output from said tube including an energy storage inductor connected in series with a variable resistor, a first semi-conducting crystal rectifier having a Zener breakdown voltage and connected to limit the voltage across said inductor and said variable resistor to less than said Zener voltage, and a current indicating meter shunted by a large capacitor both in series with a second current rectifier and connected to receive the energy stored in said inductor and to produce therefrom a meter reading proportional to the intensity of the radiation being measured.

7. The combination of elements as in claim 6 in which said inductor and said variable resistor are in series with said tube and said means to energize.

8. The combination of elements as in claim 6 in which said inductor is shunted by a temperature compensating resistor and by said meter and said capacitor in series with said second current rectifier.

9. An apparatus of the character described comprising a radiation detecting tube having two electrodes, power supply means for applying a high voltage to one of said electrodes to enable said tube to generate pulses when exposed to radiation to be measured, and measuring means for converting the pulses generated by said tube into a meter reading indicative of the intensity of radiation falling on said tube, said measuring means including an inductance winding having a relatively large value of inductance and connected in direct-current series with said tube and said power supply means, and a relatively low resistance microammeter shunted by a capacitor, said microammeter being connected in direct-current parallel with said inductance winding through a rectifier, said rectifier being poled to oppose current flow directly from said tube through said microammeter whereby the relatively high impedance pulses generated by said tube can efficiently be converted into a meter reading on said relatively low resistance microammeter.

10. The combination of elements as in claim 9 in which said rectifier has a Zener breakdown voltage whereby the reading of said microammeter becomes substantially independent of the size of the pulses generated by said tube.

11. The combination of elements as in claim 9 in further combination with voltage limiting means for limiting the maximum voltage across said inductance winding.

12. In a penetrating radiation measuring instrument wherein radiation falling on the instrument causes relatively low energy, low current high impedance pulses whose repetition rate is approximately proportional to the intensity of the radiation, means to convert the energy of said pulses into useable form to give a mechanical deflection on a relatively low impedance meter, said means including a core of magnetic material and a single winding thereon through which said pulses are passed, their energy being converted into magnetic fields in said core, and stabilizing means coupling the energy of said fields to said meter to give a deflection thereon proportional to the repetition rate of said pulses, said stabilizing means including a crystal rectifier having a Zener breakdown voltage and connected to limit the voltage across said winding produced by each of said pulses whereby the reading of said meter is made effectively independent of pulse amplitude within a range of amplitudes.

13. In a circuit of the character described a source of low current, short duration, relatively high voltage pulses, and means to convert the energy in said pulses into a mechanical deflection of a relatively low resistance current-meter, said means being coupled to said source and including a winding on a magnetic core, a crystal diode and a low resistance current meter connected in series with said winding and a temperature compensating resistor connected in parallel with said winding.

14. The combination of elements as in claim 13 in which said crystal diode has a Zener breakdown voltage and is poled to limit the voltage across said winding to approximately said Zener voltage.

References Cited in the file of this patent

UNITED STATES PATENTS

| | | |
|---|---|---|
| 2,620,446 | Le Vine et al. | Dec. 2, 1952 |
| 2,675,484 | Hepp | Apr. 13, 1954 |
| 2,676,270 | Lahti | Apr. 20, 1954 |
| 2,764,696 | Hepp | Sept. 25, 1956 |